US009558041B2

(12) United States Patent
Vadkerti et al.

(10) Patent No.: US 9,558,041 B2
(45) Date of Patent: Jan. 31, 2017

(54) TRANSPARENT NON-UNIFORM MEMORY ACCESS (NUMA) AWARENESS (71) Applicant: Telefonaktiebolaget L M Ericsson (publ), Stockholm (SE)

(72) Inventors: László Vadkerti, Mountain View, CA (US); András Kovács, San Jose, CA (US)

( * ) Notice: Subject to any disclaimer, the term of this patent is extended or adjusted under 35 U.S.C. 154(b) by 9 days.

(21) Appl. No.: 14/533,940

(22) Filed: Nov. 5, 2014

(65) Prior Publication Data

US 2016/0070598 A1   Mar. 10, 2016

Related U.S. Application Data (60) Provisional application No. 62/046,769, filed on Sep. 5, 2014.

(51) Int. Cl.
*G06F 9/50* (2006.01)
*G06F 9/455* (2006.01)

(52) U.S. Cl.
CPC ......... *G06F 9/5016* (2013.01); *G06F 9/45558* (2013.01); *G06F 9/5005* (2013.01);
(Continued)

(58) Field of Classification Search
CPC .. G06F 9/5016; G06F 9/45558; G06F 9/5005; G06F 9/5077
See application file for complete search history.

(56) References Cited

U.S. PATENT DOCUMENTS 7,577,813 B2 * 8/2009 Nijhawan ............. G06F 9/5016
711/147
7,814,491 B1 * 10/2010 Chen ..................... G06F 9/5016
709/226

(Continued)

OTHER PUBLICATIONS

Liu, M., et al., Optimizing Virtual Machine Consolidation Performance on NUMA Server Architecture for Cloud Workloads, Proceeding of the 41st annual international symposium on Computer architecuture, 2014, pp. 325-336, [retrieved on Nov. 8, 2016], Retrieved from the Internet: <URL:http://dl.acm.org/>.*

(Continued)

*Primary Examiner* — Geoffrey St Leger
(74) *Attorney, Agent, or Firm* — Nicholson De Vos Webster & Elliott LLP (57) ABSTRACT A computing device having a non-uniform memory access (NUMA) architecture implements a method to attach a resource to an application instance that is unaware of a NUMA topology of the computing device. The method includes publishing the NUMA topology of the computing device, where the published NUMA topology indicates for one or more resources of the computing device, a NUMA socket associated with each of the one or more resources of the computing device. The method further includes grouping one or more resources that have a same attribute into a resource pool, receiving a request from the application instance for a resource from the resource pool, determining a central processing unit (CPU) assigned to execute the application instance, where the CPU is associated with a NUMA socket, choosing a resource from the resource pool that is associated with a NUMA socket that is closest to the NUMA socket associated with the CPU assigned to execute the application instance, and attaching the chosen resource to the application instance.

15 Claims, 4 Drawing Sheets (52) U.S. Cl.
CPC .. *G06F 9/5077* (2013.01); *G06F 2009/45595* (2013.01); *G06F 2209/502* (2013.01); *G06F 2209/5011* (2013.01); *G06F 2212/2542* (2013.01)

(56) References Cited

U.S. PATENT DOCUMENTS

| | | | |
|---|---|---|---|
| 9,229,878 B2 * | 1/2016 | Hod | G06F 11/34 |
| 2001/0042139 A1 * | 11/2001 | Jeffords | G06F 9/5016 |
| | | | 719/316 |
| 2006/0143350 A1 * | 6/2006 | Miloushev | G06F 9/5016 |
| | | | 710/242 |
| 2007/0083728 A1 | 4/2007 | Nijhawan et al. | |
| 2010/0217949 A1 * | 8/2010 | Schopp | G06F 9/5077 |
| | | | 711/173 |
| 2012/0278800 A1 * | 11/2012 | Nicholas | G06F 9/45558 |
| | | | 718/1 |
| 2013/0326109 A1 * | 12/2013 | Kivity | G06F 9/5016 |
| | | | 711/6 |
| 2014/0237151 A1 * | 8/2014 | Jacobs | G06F 9/5005 |
| | | | 710/268 |
| 2014/0365738 A1 * | 12/2014 | Hod | G06F 12/0284 |
| | | | 711/160 |
| 2015/0242342 A1 * | 8/2015 | Suzuki | G06F 13/1663 |
| | | | 711/148 |
| 2015/0355946 A1 * | 12/2015 | Kang | G06F 9/5011 |
| | | | 718/104 |
| 2015/0370586 A1 * | 12/2015 | Cooper | G06F 9/45533 |
| | | | 710/308 |
| 2016/0085571 A1 * | 3/2016 | Kim | G06F 9/45558 |
| | | | 718/1 |

OTHER PUBLICATIONS

Rao, D. S., et al., vNUMA-mgr : Managing VM Memory on NUMA Platforms, 2010 International Conference on High Performance Computing (HiPC), 2010, 10 pages, [retrieved on Nov. 8, 2016], Retrieved from the Internet: <URL:http://ieeexplore.ieee.org/>.*

* cited by examiner

Figure 4

TRANSPARENT NON-UNIFORM MEMORY ACCESS (NUMA) AWARENESS

CROSS-REFERENCE TO RELATED APPLICATION

The present application claims priority from U.S. Provisional Patent Application No. 62/046,769, filed on Sep. 5, 2014.

FIELD

Embodiments of the invention relate to the field of non-uniform memory access (NUMA) architecture. More specifically, the embodiments relate to providing transparent NUMA awareness to applications running on a computing device having a NUMA architecture.

BACKGROUND

Data-plane applications are responsible for processing and forwarding packets in a computer network. Data-plane applications often rely on large-scale multi-core computing systems employing a non-uniform memory access (NUMA) architecture. A computer system employing a NUMA architecture generally includes one or more sockets. Each socket includes one or more cores (i.e., processors or central processing units). In a NUMA architecture, memory is distributively located across the sockets. As such, memory access time depends on memory location relative to a processor/socket. In particular, in a NUMA architecture, a processor can access its own local memory faster than non-local memory (i.e., memory located on another socket). Accordingly, local memory access may provide an improvement in performance over remote memory access.

Existing frameworks for developing packet forwarding applications usually require detailed knowledge about the hardware and the environment on the application side. As a result, developing and configuring NUMA aware application code becomes complex and environment specific. Moreover, in a virtualized environment, physical NUMA topology is usually not exposed to the operating system (OS) running in the virtual machine.

SUMMARY

A computing device having a non-uniform memory access (NUMA) architecture implements a method to attach a resource to an application instance that is unaware of a NUMA topology of the computing device. The method includes publishing the NUMA topology of the computing device, where the published NUMA topology indicates for one or more resources of the computing device, a NUMA socket associated with each of the one or more resources of the computing device. The method further includes grouping one or more resources that have a same attribute into a resource pool, receiving a request from the application instance for a resource from the resource pool, determining a central processing unit (CPU) assigned to execute the application instance, where the CPU is associated with a NUMA socket, choosing a resource from the resource pool that is associated with a NUMA socket that is closest to the NUMA socket associated with the CPU assigned to execute the application instance, and attaching the chosen resource to the application instance.

A computing device having a non-uniform memory access (NUMA) architecture attaches a resource of the computing device to an application instance that is unaware of a NUMA topology of the computing device. The computing device includes a storage device and one or more processors distributed across one or more NUMA sockets coupled to the storage device. The storage device stores a publisher component, a resource manager component, and a resource allocator component. A subset of the one or more processors executes the publisher component, the resource manager component, and the resource allocator component. The publisher component is configured to publish the NUMA topology of the computing device, where the published NUMA topology indicates for one or more resources of the computing device, a NUMA socket associated with each of the one or more resources of the computing device. The resource manager component is configured to group one or more resources that have a same attribute into a resource pool. The resource allocator component is configured to receive a request from the application instance for a resource from the resource pool, to determine a processor assigned to execute the application instance, where the processor is associated with a NUMA socket, to choose a resource from the resource pool that is associated with a NUMA socket that is closest to the NUMA socket associated with the processor assigned to execute the application instance, and to attach the chosen resource to the application instance.

A non-transitory computer readable medium has instructions stored therein to be executed by a computing device having a non-uniform memory access (NUMA) architecture to attach a resource of the computing device to an application instance that is unaware of a NUMA topology of the computing device. The execution causes the computing device to perform a set of operations including, publishing the NUMA topology of the computing device, where the published NUMA topology indicates for one or more resources of the computing device, a NUMA socket associated with each of the one or more resources of the computing device. The set of operations further include grouping one or more resources that have a same attribute into a resource pool, receiving a request from the application instance for a resource from the resource pool, determining a central processing unit (CPU) assigned to execute the application instance, where the CPU is associated with a NUMA socket, choosing a resource from the resource pool that is associated with a NUMA socket that is closest to the NUMA socket associated with the CPU assigned to execute the application instance, and attaching the chosen resource to the application instance.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods and apparatus for providing transparent Non-Uniform Memory Access (NUMA) awareness. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A computing device stores and transmits (internally and/or with other computing devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, a computing device (e.g., a computer) includes hardware and software, such as a set of one or more processors coupled to one or more machine-readable storage media to store code for execution on the set of processors and/or to store data. For instance, a computing device may include non-volatile memory containing the code since the non-volatile memory can persist code/data even when the computing device is turned off (when power is removed), and while the computing device is turned on that part of the code that is to be executed by the processor(s) of that computing device is typically copied from the slower non-volatile memory into volatile memory (e.g., dynamic random access memory (DRAM), static random access memory (SRAM)) of that computing device. Typical computing devices also include a set or one or more physical network interface(s) to establish network connections (to transmit and/or receive code and/or data using propagating signals) with other computing devices.

A network device is a computing device that communicatively interconnects other computing devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments of the present invention provide processes and apparatus for avoiding the disadvantages of the prior art. The disadvantages of the prior art are that application code has to have detailed knowledge about the underlying NUMA architecture to be able to allocate and assign resources in a way that minimizes access costs. As a result, the application code is closely coupled with a given hardware topology and is environment specific. This is particularly problematic in cloud environments where there are a variety of hardware and virtualization solutions with different hardware configurations and/or environments. For example, application code specifically written to run on a dual-socket NUMA architecture may not run efficiently when migrated over to a quad-socket NUMA architecture. Thus, developers have to spend time and effort to customize application code to run efficiently on different NUMA architecture configurations. Moreover, NUMA topology is usually not exposed to the operating system (OS) running in a virtual machine. Thus, applications running in a virtualized OS will not be aware of the NUMA topology, which can cause performance degradation compared to the same application running in native (i.e., non-virtualized environment).

The embodiments of the present invention overcome these disadvantages of the prior art. The disadvantages of the prior art are avoided by use of a publisher component, a resource manager component, and a resource allocator component. The publisher component publishes NUMA topology information that associates one or more resources of a computing device with a NUMA socket. The published NUMA topology information allows components of the computing device to be aware of the NUMA topology, even in a virtualized environment where the NUMA topology is typically not exposed. The resource manager component groups resources into a resource pool. An application instance can request a resource from the resource pool, and the resource allocator component can automatically assign a resource to the application instance based on certain policies such as assigning the closest available resource (in terms of NUMA socket distance) within that pool. In this fashion, resources can be assigned to an application instance in a way that minimizes or reduces access costs in a computing device employing a NUMA architecture, even if the application instance itself or the OS which it runs on is not aware of the underlying NUMA topology.

Figure 1:
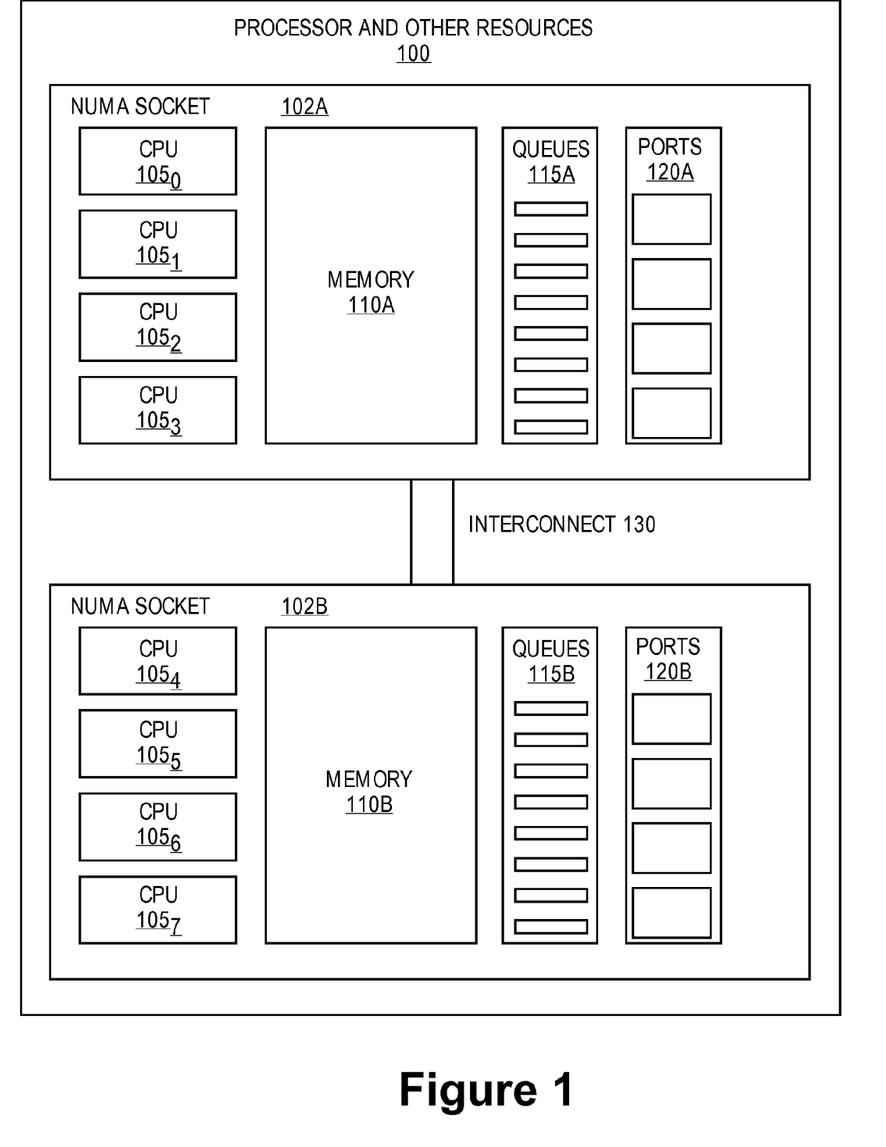
FIG. 1 is a block diagram illustrating one embodiment of processors and other resources in a NUMA architecture.
Figure 2:
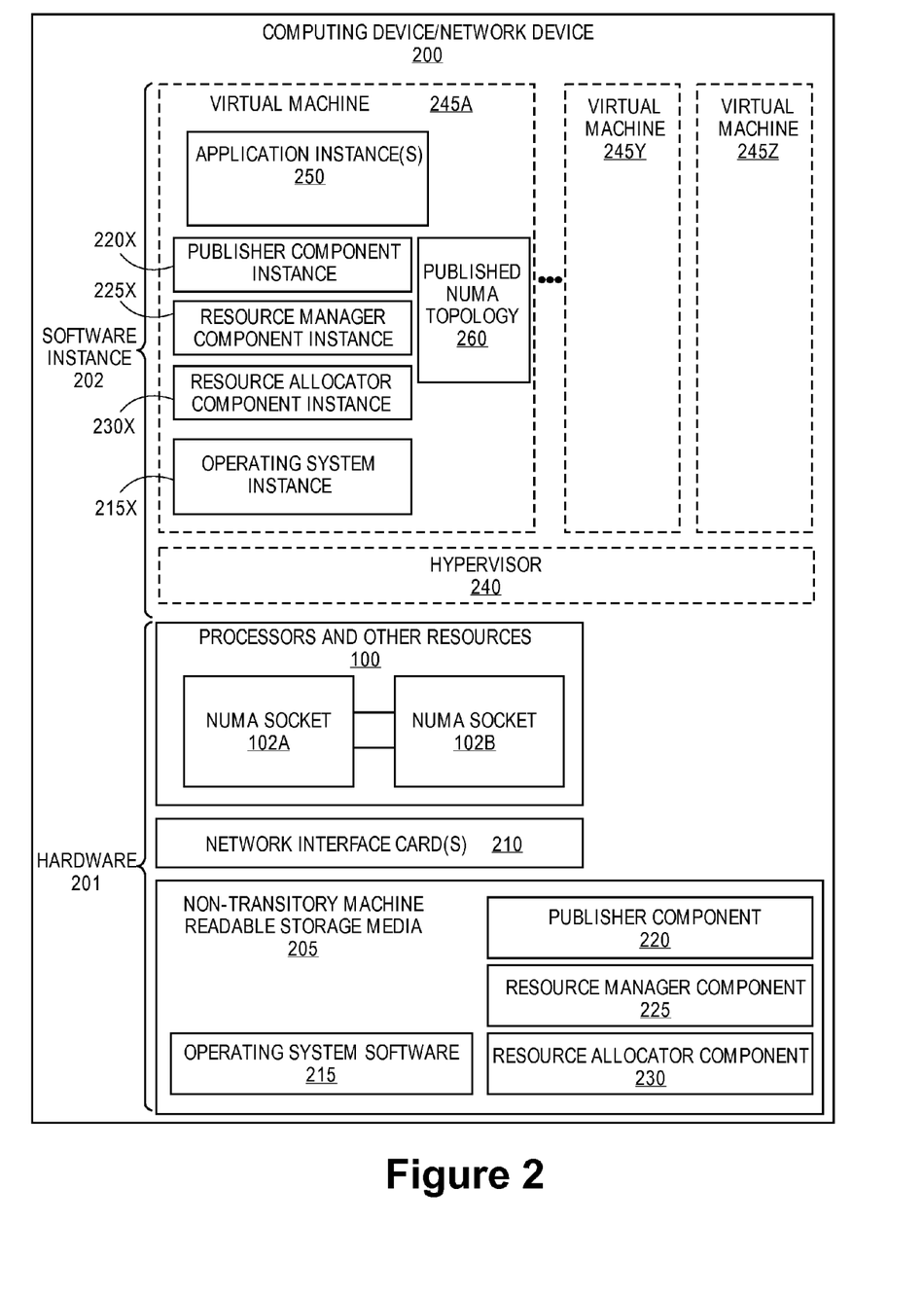
FIG. 2 is a block diagram illustrating one embodiment of a computing device that provides transparent NUMA awareness.

Some embodiments are disclosed in the context of an example computing device employing a NUMA architecture as illustrated in FIG. 1 and FIG. 2. An overview of the computing device is initially provided, and then various diagrams disclosed herein are explained in the context of the computer device. However, it should be understood that the operations of the diagrams can be performed by embodiments of the invention other than those discussed with reference to FIG. 1 and FIG. 2, and the embodiments discussed with reference to FIG. 1 and FIG. 2 can perform operations different than those discussed with reference to the other diagrams.

FIG. 1 is a block diagram illustrating one embodiment of processors and other resources in a NUMA architecture.

The processors and other resources 100 can be housed in NUMA socket 102A and NUMA socket 102B. A socket may generally be understood to represent microchips or chip sets which include a plurality of central processing units (CPUs) or processing cores 105 thereon. NUMA socket 102A includes CPUs $105_0$-$105_3$ and NUMA socket 102B includes CPUs $105_4$-$105_7$. NUMA socket 102A can communicate with NUMA socket 102B over an interconnect 130. In one embodiment, the interconnect 130 employs a Quickpath Interconnect (QPI) protocol and wiring structure. For the sake of simplicity and clarity, the processors and other resources 100 are illustrated as having an arrangement with two NUMA sockets 102 and four CPUs 105 per socket. However, one of ordinary skill in the art will understand that FIG. 1 is just an exemplary embodiment, and that in other embodiments, there can be any number of NUMA sockets 102 and any number of CPUs 105 per NUMA socket. Also, the NUMA sockets 102 can be arranged and interconnected in any fashion. For example, NUMA sockets 102 can be arranged and interconnected in a ring topology. Also, NUMA sockets 102 can be interconnected over a network such as a local area network (LAN), wide area network (WAN), or any other type of communications network (i.e., remote memory via network connection).

As further illustrated in FIG. 1, each NUMA socket 102 may also include one or more memories 110. In a NUMA architecture, CPUs 105 are enabled to access memory resources distributed across NUMA sockets 102. A memory resource is considered a local memory resource with respect to a NUMA socket 102 if the memory resource resides on that NUMA socket 102. A memory resource is considered a remote memory resource with respect to a NUMA socket 102 if the memory resource resides on a different NUMA socket 102. For example, from the perspective of NUMA socket 102A, memory 110A is a local memory resource, while memory 110B is a remote memory resource. For a given NUMA socket 102, accessing local memory resources is typically faster (i.e., lower latency) than accessing remote memory resources. As such, it is preferable to utilize local memory resources, when available.

Each NUMA socket 102 may also include one or more queues 115, ports 120, devices, and other types of resources. The queues 115 can temporarily store packets that are awaiting processing or awaiting transmission. Each of the queues 115 can include an Rx buffer to store or buffer received packets prior to processing and a Tx buffer to store packets for transmission. The ports 120 are used for accessing network devices and may be a pool of queue resources. Similar to the discussion above with regard to memory resources, a resource is considered a local resource with respect to a NUMA socket 102 if the resource resides on that NUMA socket. A resource is considered a remote resource with respect to a NUMA socket 102 if the resource resides on a different NUMA socket 102. As with memory 110, accessing a local resource is typically faster than accessing a remote resource. Thus, as described above, the hardware arrangement of FIG. 1 represents a NUMA architecture because the various CPUs 105 do not have the same or uniform access time with respect to all memories 110/resources.

FIG. 2 is a block diagram illustrating one embodiment of a computing device that provides transparent NUMA awareness.

The computing device 200 includes hardware 201 including processors and other resources 100 having a NUMA architecture as described with reference to FIG. 1 (including NUMA socket 102A and NUMA socket 102B), Network Interface Cards (NICs) 210, as well as non-transitory machine readable storage media 205 having stored therein OS software 215, a publisher component 220, a resource manager component 225, and a resource allocator component 230. The computing device 200 can include any number of NICs 210 to enable communication with other computing devices over a wired or wireless network connection. During operation, the processors 105 execute software to instantiate a hypervisor 240 (sometimes referred to as a virtual machine monitor (VMM)) and one or more virtual machines 245 that are run by the hypervisor 240, which are collectively referred to as software instance(s) 202. A hypervisor 240 is a software service that virtualizes the underlying hardware to provide a subset of the sharable hardware resources on behalf of virtual machines 245. A virtual machine 245 is a software implementation of a physical machine that runs applications as if they were executing on a physical, non-virtualized machine; and applications generally do not know they are running on a virtual machine 245 as opposed to running on a "bare metal" host computing device, though some systems provide para-virtualization for optimization purposes. In one embodiment, the computing device 200 is a network device where each of the virtual machines 245, and that part of the hardware 201 that executes that virtual machine 245 (be it hardware dedicated to that virtual machine and/or time slices of hardware temporally shared by that virtual machine with others of the virtual machine(s)), executes data plane networking application(s) (sometimes referred to as user plane applications or forwarding plane applications). This virtualization of the hardware is sometimes referred to as network function virtualization (NFV). Thus, NFV may be used to consolidate many network equipment types onto industry standard high volume server hardware, physical switches, and physical storage, which could be located in data centers, network devices, and customer premise equipment (CPE).

The computing device 200 and/or the virtual machine(s) 245 can run an OS. The OS can be Microsoft Windows, Linus, UNIX, or any other type of OS. In one embodiment, a Linux OS can be run on a virtual machine 245 using a Xen hypervisor. Other hypervisor products besides Xen can be used to manage one or more virtual machines 245 as well. An OS running in native (i.e., not running on a virtual machine 245) is typically aware of the NUMA topology, which can then be used by applications to achieve NUMA awareness. However, NUMA topology is typically not exposed to an OS running on a virtual machine 245. Thus, applications running on a virtualized OS can experience performance degradation compared to the same application running in native.

The computing device 200 and/or the virtual machine(s) 245 may also run one or more application instances 250. Each of the application instances 250 are typically pinned to a given CPU 105. In one embodiment, an application can specify which CPU 105 an application instance 250 should be executed on. In one embodiment, the platform assigns a CPU 105 for the application instance 250. Before or during execution, application instances 250 may allocate and/or access resources of the computing device 200. Such resources may include, but are not limited to, memory pages (e.g., hugepages), CPUs, I/O devices, device queues, and packet buffer pools. In a NUMA architecture, it is preferable that an application instance 250 allocate and/or access resources that are local to the NUMA socket 102 on which the application instance 250 is being executed, to reduce access costs.

In one embodiment, the computing device 200 and/or the virtual machine(s) 245 can instantiate and execute a publisher component instance 220X, a resource manager component instance 225X, and a resource allocator component instance 230S to provide transparent NUMA awareness for applications. Those skilled in the art will understand that the components are an example organization of the computing device 200 and are provided by way of example and not limitation, and that other organizations of the functions and components are possible. One or more of the components may be implemented using different combinations of software, firmware, and/or hardware. In one embodiment, the components can be implemented as modifications and/or add-ons to the Intel Dataplane Development Kit (DPDK), which provides a programming framework that enables fast development of high speed data packet networking applications running on x86 processors.

The publisher component 220 can detect the NUMA topology of the computing device 200 and publish the detected NUMA topology (e.g., published NUMA topology 260) so that other components of the computing device 200 can be made aware of the underlying NUMA topology. As discussed above, the underlying NUMA topology is typically not exposed to an OS running on a virtual machine 245. Also, as discussed above, different types of NUMA architectures exist, and may vary with respect to one another in terms of the number of NUMA sockets 102, the number of CPUs 105 per NUMA socket 102, and memory structure, just to name a few example variations that may occur. By publishing the underlying NUMA topology, an application and/or OS running in a virtualized environment can be made aware of the underlying NUMA topology. In one embodiment, the publisher component 220 uses a dedicated channel between the hypervisor 240 and virtual machine 245 to detect the NUMA topology of the computing device 200. In one embodiment, the publisher component 220 can detect the NUMA topology based on measuring and comparing the speed and/or latency of defined memory areas. Resources that can be detected and published by the publisher component 220 include, but are not limited to, memory pages (e.g., hugepages), CPUs, I/O devices, device queues, and packet buffer pools. In one embodiment, the published NUMA topology 250 identifies a NUMA socket 102 associated with a particular resource. For example, the published NUMA topology 250 may indicate that CPU $105_0$ is associated with NUMA socket 102A and CPU $105_4$ is associated with NUMA socket 102B. As another example, the published resource topology may indicate that a particular memory page is associated with NUMA socket 102A and another memory page is associated with NUMA socket 102B. The published NUMA topology 250 may also include other attributes of the resources besides NUMA socket information. In one embodiment, the publisher component 220 can be used to simulate different NUMA architecture environments to the application by publishing a particular NUMA topology to be simulated.

In one embodiment, the publisher component 220 publishes the NUMA topology in an attribute tree. The attribute tree organizes the various resources of the computing device 200 and their respective attributes in a tree structure having directories/branches and attributes in the directories/branches. However, one of ordinary skill in the art will understand that the NUMA topology can be published in any other form or format. For example, in one embodiment, the NUMA topology can be published as a table in a relational database.

The resource manager component 225 can organize one or more resources of the computing device 200 as resource pools and maintain the resource pools in a resource database. In one embodiment, resources of a similar type and/or attributes, but having different NUMA socket location, can be grouped in the same resource pool. For example, memory partitions of the same size can be grouped into a resource pool. Such a resource pool can be considered as a collection of memory partitions having a particular size. The memory partitions belonging to this resource pool could reside on different NUMA sockets 102. For example, some of the memory partitions in the resource pool may reside on NUMA socket 102A, while other memory partitions may reside on NUMA socket 102B. A resource pool can group other types of resources as well. For example, a resource pool can be a collection of CPUs, hugepages (e.g., 2 MB and 1 GB hugepages), packet pools (relying on a memory partition resource), network devices (ports), or other types of devices (e.g., Peripheral Component Interconnect (PCI) devices of a given type). In one embodiment, the resource pool maintains NUMA socket information for each of the resources in that resource pool. In one embodiment, the resource pool also maintains other attributes of the resources, depending on the type of the resource. For example, for memory partition resources, the resource pool may store the size attribute of the memory partition. In one embodiment, a resource pool can also be a part of another resource pool. For example, a resource pool can include I/O ports where each I/O port is a resource pool of Rx/Tx queues. In one embodiment, a configuration file can be used to configure the resource pools, as will be described herein further below in additional detail.

The resource allocator component 230 can receive a request from an application instance 250, for a resource from a particular resource pool. The resource allocator component 230 can then automatically choose the closest available resource from that resource pool for the application instance 250 and attach that resource to the application instance 250. The resource allocator component 230 is aware of the NUMA topology and uses this information to choose the closest available resource, preferably a resource that resides on the same NUMA socket 102 as the requesting application instance. In one embodiment, the resource allocator component 230 is made aware of the NUMA topology based on NUMA topology information provided by the OS. In other embodiments, the resource allocator component 230 is made aware of the NUMA topology based on the NUMA topology published by the publisher component 220. Since the resource allocator component 230 has awareness of the NUMA topology, it can allocate resources to an application instance 250 in a way that minimizes or reduces access costs in a NUMA architecture. Also, this means that the application instance 250 need not be aware of the underlying NUMA topology when requesting resources. In one embodiment, the resource allocator component 230 can receive a request from an application instance 250 for a particular resource within a resource pool. For example, the application instance 250 can specify a particular resource using an index that identifies the particular resource. The resource allocator component 230 can then attach the requested resource to the application instance 250 (if available) in lieu of selecting the closest available resource.

While the computing device 200 described above with reference to FIG. 2 illustrates the various components and applications being executed in a computer system running virtual machines (i.e., virtualized environment), it should be understood that the various components and applications can also be executed by the computing device 200 without the use of virtual machines (i.e., a non-virtualized environment).

Figure 3:
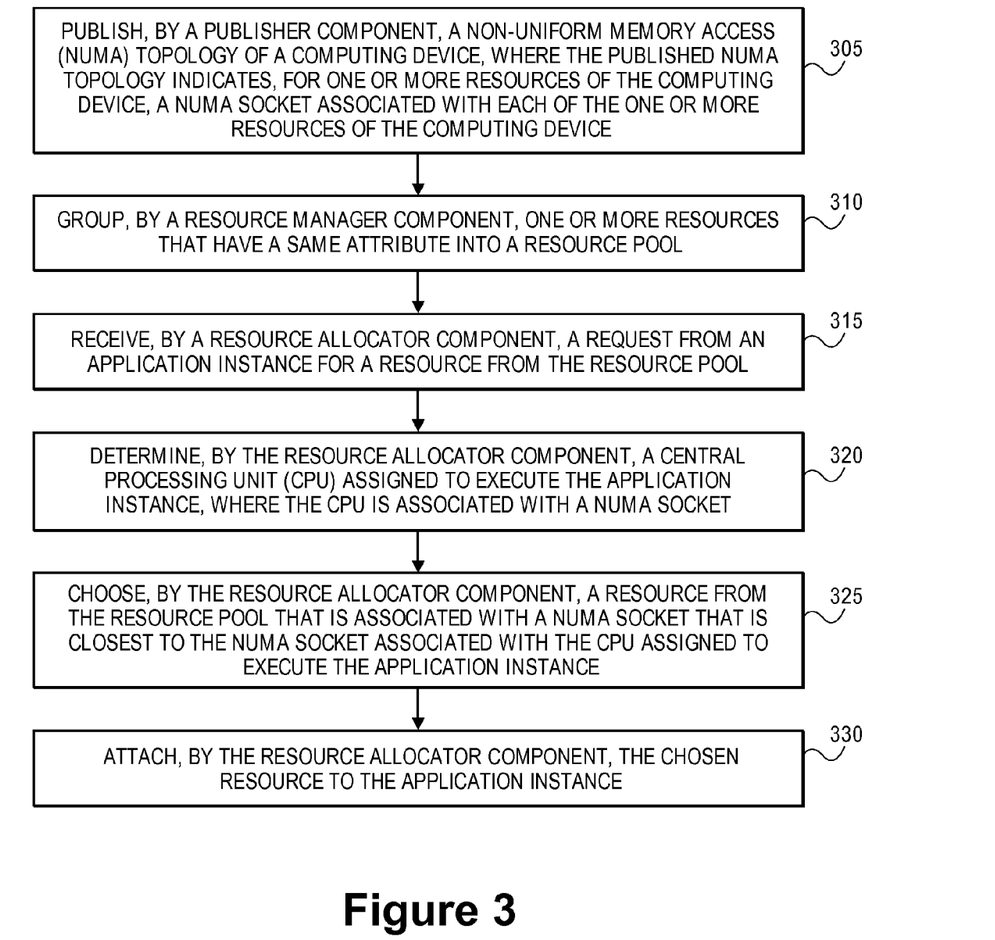
FIG. 3 is a flowchart of one embodiment of a process for attaching a resource to an application instance in a computing device that provides transparent NUMA awareness.

FIG. 3 is a flowchart of one embodiment of a process for attaching a resource to an application instance in a computing device that provides transparent NUMA awareness. The operations of the flow diagram may be performed by various components of the computing device 200, which may be implemented as processing logic in software, hardware, or a combination thereof. While the flowchart in FIG. 3 shows a particular order of operations performed by certain embodiments of the invention, it should be understood that such order is exemplary (e.g., alternative embodiments may perform the operations in a different order, combine certain operations, overlap certain operations, etc.).

The publisher component 220 publishes a NUMA topology of a computing device 200 having a NUMA architecture, where the published NUMA topology indicates, for one or more resources of the computing device 200, a NUMA socket 102 associated with each of the one or more resources of the computing device 200 (block 305). As discussed above, an OS running on a virtual machine 245 is typically not aware of the underlying NUMA topology. The publisher component 220 publishes the NUMA topology so that the OS or any other component of the computing device 200 can be made aware of the NUMA topology. In one embodiment, the NUMA topology describes the topology of various resources of the computing device 200 including, but not limited to, memory pages (e.g., hugepages), CPUs, I/O devices, device queues, and packet buffer pools. In one embodiment, the NUMA topology is published as an attribute tree. As discussed above, the publisher component 220 can detect the underlying NUMA topology based on information exchanged via a dedicated communication channel between the hypervisor 245 and the virtual machine 245 or based on measuring and comparing the speed and/or latency of defined memory areas. It is to be noted that publishing the NUMA topology may be optional if the components of the computing device 200 are already aware of the NUMA topology or otherwise have access to the NUMA topology of the computing device 200.

The resource manager component 225 groups one or more resources that have a same attribute into a resource pool (block 310). In one embodiment, resources having a same attribute, but having different NUMA socket location, are grouped in the same resource pool. For example, memory partitions of the same size can be grouped into a resource pool. In one embodiment, the resource manager component 225 groups resources into resource pools based on configurations described in a configuration file. The resource manager component 225 can parse the configuration file to determine how to organize the resources into resource pools. This information can then be stored in a resource database. In one embodiment, the resource database stores information regarding the resource pool, the resources within each the resource pool, and the attributes of each of the resources within the resource pool. For example, the resource database may store the name of the pools, the type of the pool (e.g., pool of memory partitions, pool of CPUs, pool of ports, etc.), the CPUs 105 involved with the pool (availability), and any additional information. For example, the resource database may store NUMA socket information of the resources.

In one embodiment, an application can describe all the resource requirements for application instances 250 (e.g., each application instance needs dedicated CPU, named memory partitions, Rx/Tx queues, etc.) and these resources are grouped as an execution unit. Execution units could be pre-allocated based on the resource requirements. For example, an execution unit can be a group of NUMA-aligned resources including a dedicated CPU 105 to pin the application instance to, a dedicated Rx/Tx queue of a given device, shared memory partitions, and private memory partitions. An execution unit pool can then contain many execution units. When an application makes a request for an execution unit from the execution unit pool, an available execution unit is assigned to the application instance 250.

The resource allocator component 230 receives a request from an application instance 250 for a resource from the resource pool (block 315). In one embodiment, the request includes the name of the requested resource pool. The resource allocator component 230 then determines a CPU 105 assigned to execute the application instance, where the CPU 105 is associated with a NUMA socket 102 (block 320). In one embodiment, the application instance 250 has been pre-assigned a CPU 105 on which to execute. In other embodiments, the platform needs to assign a CPU 105 for the application instance 250. In one embodiment, the resource allocator component 230 can determine which NUMA socket is associated with the CPU 105 (i.e., on which NUMA socket 102 the CPU 105 is located) based on its knowledge of the NUMA topology. As discussed above, the resource allocator component 230 can be made aware of the NUMA topology based on information provided by the OS or based on NUMA topology published by the publisher component 220. The resource allocator component 230 chooses a resource from the resource pool that is associated with a NUMA socket 102 that is closest to the NUMA socket 102 associated with the CPU 105 assigned to execute the application instance (block 325). In one embodiment, the resource allocator component 230 chooses a resource from the requested resource pool that is located in the same NUMA socket 102 as the application instance 250. In one embodiment, the resource allocator component 230 accesses the resource database to choose a resource from the resource pool. The resource allocator component 230 then attaches the chosen resource to the application instance 250 (block 330). As a result of the process described above, the application instance 250 attaches to a resource that is closest in terms of NUMA socket distance even if the application instance 250 itself and/or the OS on which it is running is unaware of the underlying NUMA topology.

As discussed above, a configuration file can be used to configure the various resources needed by an application. An example of a configuration file is described below. For simplicity and clarity, a configuration file for configuring memory resources will be described in additional detail herein below. However, one of ordinary skill in the art will understand that the configuration file can also be used to configure other types of resources.

```
memdomain AppPrivate {
    type = excl
    cpualias = "foreground"
    size {
        is_per_cpu = true
        huge_2M = 1G
        huge_1G = 3G
    }
}
```

```
}
memdomain AppNuma {
    type = numa
    cpualias = "foreground"
    size {
        is_per_numa = true
        huge_2M = 0
        huge_1G = 1G
    }
}
memdomain AppDefault {
    type = default
    cpualias = "all"
    size {
        huge_2M = 1G
        huge_1G = 0
    }
}
cpualias all {
    cpumask = "0-7"
}
cpualias foreground {
    cpumask = "2, 3, 5, 6, 7"
}
```

In one embodiment, the configuration file allows an application to describe its resource needs in a per instance type fashion. For example, the configuration file can indicate that each application instance 250 should get access to private memory, get access to a shared NUMA replicated memory partition, and get access to a memory partition which is shared by all other instances of the same type. The configuration file can be used to configure any number of resources. A memory pool configuration can be described using the following parameters: name, type, cpualias, and size.

The name parameter is a name assigned to the memory pool. The name must be unique across all memory pools in order to uniquely identify the memory pool. An application instance 250 can thus request a memory partition from a particular memory pool by name.

The type parameter indicates whether the memory partition is to be a per-application instance private memory, per-NUMA node shared memory, or default shared memory. A type value of "excl" indicates that the memory is per-application instance private memory. A per-application instance private memory indicates that each application instance 250 is to have its own private memory partition that is only visible to that application instance 250. A type value of "numa" indicates that the memory is per-NUMA node shared memory. A per NUMA node shared memory indicates that each NUMA socket 102 is to have its own memory partition and application instances 250 tied to the same NUMA node share the same memory partition. A type value of "default" indicates that a single memory partition should be created that is shared by all application instances 250.

The cpualias parameter indicates which CPUs 105 are involved with this particular memory pool configuration. In one embodiment, the cpualias value is an alias for a set of CPUs 105. For example, the configuration file can describe that a cpualias value of "all" corresponds to a set of CPUs 105 containing all the CPUs 105 (i.e., $105_0$-$105_7$). As another example, the configuration file can describe that a cpualias value of "foreground" corresponds to CPUs $105_2$, $150_3$, $105_5$, $105_6$, and $105_7$. The set of CPUs that are represented by a cpualias can be described using a string representation of a cpumask as used in Linux's cpusets. For example, a cpumask string value of "0-2, 15" indicates a set of CPUs containing CPUs 0, 1, 2, and 15. A cpumask string value of "1-3, 8, 10-11" indicates a set of CPUs containing CPUs 1, 2, 3, 8, 10, and 11. As a further example, a cpumask string value of "0-8:2" indicates a set of CPUs containing CPUs 0, 2, 4, 6, and 8 (every second CPU from 0-8).

The size parameter indicates the size of the memory partitions that are to be allocated. In one embodiment, the size parameter can specify the size of the memory partition in bytes and the page size to be used to allocate that memory partition. In one embodiment, the size parameter supports the use of hugepages. For example, the size of the memory partition can be described in terms of 2 MB hugepages and 1 GB hugepages. In one embodiment, the default setting is that the size parameter is the total memory available for the memory pool, irrespective of how many memory partitions are in the memory pool. In one embodiment, an additional parameter, is_per_cpu, can be set to true to indicate that the total memory available for the memory pool should be multiplied by the number of CPUs 105 in the cpualias. In one embodiment, an additional parameter, is_per_numa, can be set to true to indicate that the total memory available for the memory pool should be multiplied by the number of NUMA sockets 102 used by the CPUs 105 in the cpualias.

At application startup, the configuration file is parsed and memory partitions are grouped into resource pools according to the configuration described in the configuration file. An example of how the exemplary configuration file partitions memory into resource pools will be described herein below with reference to FIG. 4.

Figure 4:
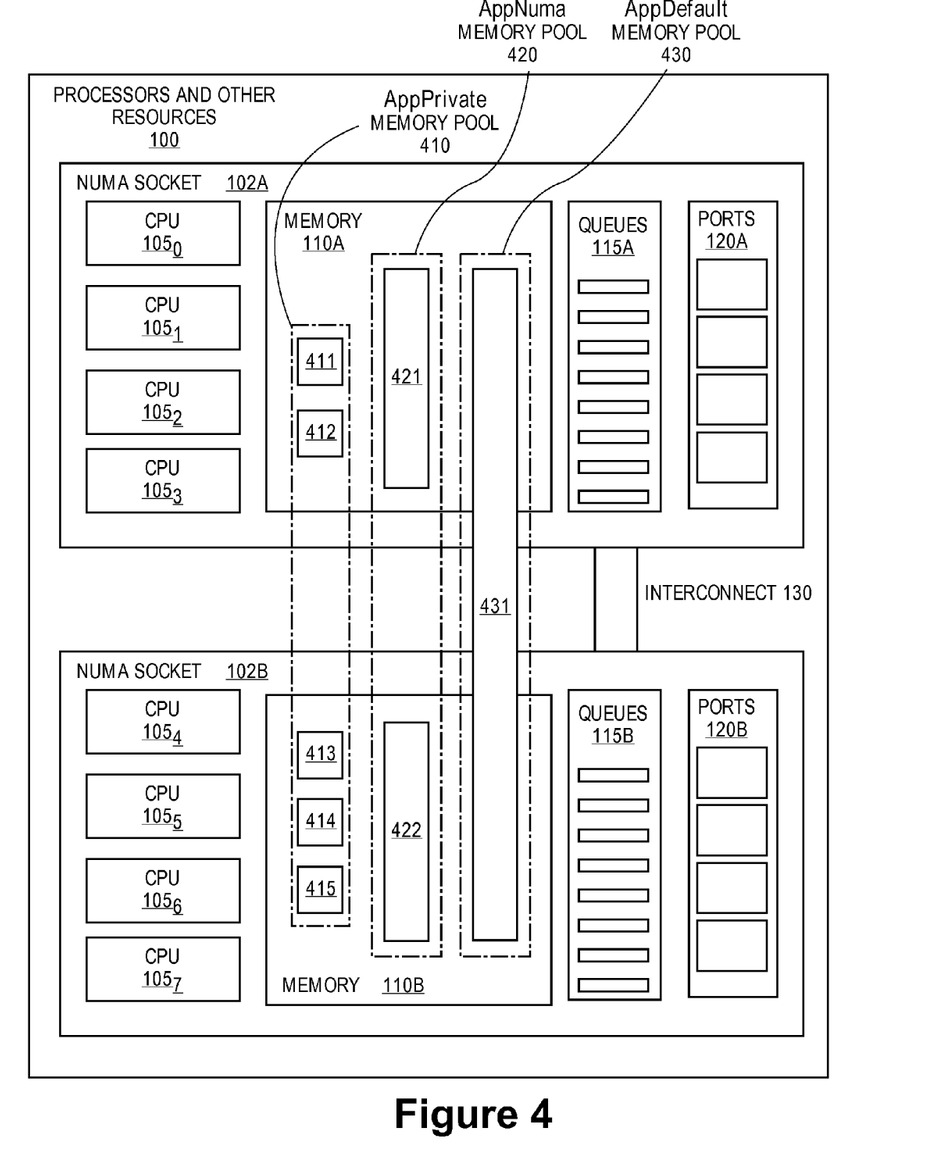
FIG. 4 is a block diagram illustrating one embodiment of how a configuration file groups memory partitions into memory pools.

FIG. 4 is a block diagram illustrating one embodiment of how a configuration file groups memory partitions into memory pools.

The exemplary configuration file defines a memory pool named "AppPrivate". The type parameter for this memory pool is "excl," meaning that this pool is for per-application instance 250 private memory. As such, a private memory partition is created for each CPU 105 that is involved with this memory, as indicated by the cpualias parameter. The cpualias parameter is foreground, so CPUs $105_2$, $105_3$, $105_5$, $105_6$, and $105_7$ are involved with this memory pool. As such, this particular memory pool configuration indicates that five separate memory partitions should be allocated for this pool. The memory partitions are allocated in the appropriate NUMA socket 102 based on the CPUs 105 involved. Since two of the involved CPUs 105 are located in NUMA socket 102A (CPUs $105_2$ and $105_3$) and three of the involved CPUs 105 are located in NUMA socket 102B (CPUs $105_5$, $105_6$, and $150_7$), two memory partitions are allocated in NUMA socket 102A (memory partition 411 and 412) and three memory partitions are allocated in NUMA socket 102B (memory partitions 413-415). The size parameter indicates that each of the memory partitions should have 1 GB allocated using 2 MB page sizes and 3 GB allocated using 1 GB page sizes. Thus, memory partitions 411-415 are part of the AppPrivate memory pool 410. Each of the memory partitions 411-415 have a size of 4 GB, so the AppPrivate memory pool 410 has a total size of 20 GB.

The exemplary configuration file also defines a memory pool named "AppNuma". The type for this memory pool is "numa," meaning that this pool is for per-NUMA node shared memory. As such, a memory partition is created for each NUMA socket 102 involved, based on the cpualias parameter. For example, if the CPUs 105 involved (as indicated by the cpualias parameter) are located both on NUMA socket 102A and NUMA socket 102B, then a memory partition is allocated on both NUMA socket 102A and NUMA socket 102B. On the other hand, if the CPUs 105 involved are all located on NUMA socket 102A, then a memory partition is allocated on NUMA socket 102A but not on NUMA socket 102B. In this case, the cpualias parameter is foreground, so CPUs $105_2$, $105_3$, $105_5$, $105_6$, and $105_7$ are involved with this memory pool. This set of CPUs 105 includes CPUs 105 from both NUMA socket 102A and NUMA socket 102B. As such, this particular memory pool configuration results in two memory partitions being allocated, one for NUMA socket 102A (memory partition 421) and one for NUMA socket 102B (memory partition 422). Application instances tied to the same NUMA node share the same memory partition. The size parameter indicates that each memory partition should have 1 GB allocated using 1 GB page sizes. Thus, memory partitions 421 and 422 are part of the AppNUMA memory pool 420. Each of the memory partitions 421 and 422 have a size of 1 GB, so the AppNUMA memory pool 420 has a total size of 2 GB.

The exemplary configuration file also defines a memory pool named "AppDefault". The type for this memory pool is default, meaning that this pool is for default shared memory. As such, a single memory partition (memory partition 431) is created that is shared by all CPUs 105 involved, as indicated by the cpualias parameter. In this case, the cpualias is all, so all CPUs $105_0$-$105_7$ are involved with this memory pool. The size parameter indicates that this memory partition should have 1 GB allocated using 2 MB page sizes. Thus, the AppDefault memory pool 430 includes a single memory partition 431 having a size of 1 GB.

At application startup, the configuration file is parsed and memory partitions are allocated and grouped into pools according to the descriptions provided in the configuration file. An application instance 250 can then request a memory partition by naming a resource pool. For example, if the application instance wishes to obtain private memory, then the application instance 250 can request a memory partition from the AppPrivate memory pool 420. The resource allocator component 230 determines which CPU 105 has been assigned to execute the application instance and assigns a memory partition from the AppPrivate memory pool 420 that is associated with a NUMA socket 102 that is closest to the NUMA socket 102 (preferably the same NUMA socket 102) associated with that CPU 105. If an application instance 250 executing on CPU $105_5$ (which is located on NUMA socket 102B) requests a memory partition from the AppPrivate memory pool 420, then the resource allocator component 230 will attach one of the memory partitions located in NUMA socket 102B (memory partitions 413-415) to the application instance, assuming one of them is available. In a similar fashion, if the application instance 250 executing on CPU $105_5$ requests a memory partition from the AppNUMA memory pool 420, then the resource allocator component 230 will attach memory partition 422 to the application instance 250. However, if an application instance 250 executing on CPU $105_2$ (which is located on NUMA socket 102A) requests a memory partition from the AppNUMA memory pool 420, then the resource allocator component 230 will attach memory partition 421 to the application instance 250. As a result, the application instance 250 attaches to a memory partition that is located at the closest NUMA node (preferably the same NUMA node), even though the application instance 250 or the OS that it runs on may not be aware of the underlying NUMA topology. In one embodiment, the application instance 250 can attach to or access more than one memory partition within a given memory resource pool. For example, the application instance 250 could attach to both memory partitions 421 and 422 within the AppNUMA memory pool 420. The application instance 250 can also specify a particular memory partition to attach/access using an index that identifies the particular memory partition, instead of having the platform automatically select the closest available memory partition.

The configuration file can be modified as needed to adapt to different execution environments. For example, in a smaller scale environment, the size of the memory partitions in the AppPrivate memory pool 410 could be just 1 GB per application instance 250 instead of 4 GB. This can be achieved by simply modifying the configuration file, without having to modify the application code itself. From the application's point of view, the AppPrivate memory pool 420 is just a pool of memory partitions from which it can obtain memory.

Thus, processes and apparatus for providing transparent NUMA awareness has been described. An advantage provided by the processes and apparatus described herein above is that they provide transparent NUMA awareness to applications, even in a virtualized environment. Also, resources can be allocated to applications in a NUMA aware manner (i.e., allocating resources that minimize remote memory access). Moreover, the resource needs of an application can be adapted to the execution environment by modifying a configuration file, without having to modify application code. This allows developers to spend less time worrying about the resource allocation code and to focus more on the packet forwarding code.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method implemented by a computing device having a non-uniform memory access (NUMA) architecture to attach a resource of the computing device to an application instance that is unaware of a NUMA topology of the computing device, the method comprising:
  detecting, by a publisher component executed by the computing device, the NUMA topology of the computing device, wherein the computing device executes a plurality of virtual machines (VMs) on a hypervisor to implement network function virtualization (NFV), wherein the application instance is executed by a first VM from the plurality of VMs;
  publishing, by the publisher component, the NUMA topology of the computing device, wherein the published NUMA topology indicates for one or more resources of the computing device, a NUMA socket associated with each of the one or more resources of the computing device, wherein the published NUMA topology is accessible to an Operating System (OS) running on the first VM from the plurality of VMs;
  grouping, by a resource manager component executed by the computing device, one or more resources that have a same attribute into a resource pool, wherein the resource pool is assigned a name by which the application instance can refer to the resource pool;
  receiving, by a resource allocator component executed by the computing device, a request from the application instance for a resource from the resource pool, wherein the request includes the name of the resource pool;
  determining, by the resource allocator component, a central processing unit (CPU) assigned to execute the application instance, wherein the CPU is associated with a NUMA socket;

choosing, by the resource allocator component, a resource from the resource pool that is associated with a NUMA socket that is closest to the NUMA socket associated with the CPU assigned to execute the application instance; and attaching, by the resource allocator component, the chosen resource to the application instance.

2. The method of claim 1, wherein detecting the NUMA topology of the computing device comprises:
measuring and comparing a speed or latency of accessing a plurality of known memory areas of the computing device.

3. The method of claim 1, wherein detecting the NUMA topology of the computing device comprises:
communicating NUMA topology information from the hypervisor to the first VM from the plurality of VMs via a dedicated communication channel between the hypervisor and the first VM.

4. The method of claim 1, wherein the one or more resources of the computing device includes any one of the following: memory pages, device queues, input/output (I/O) devices, and packet buffer pools.

5. The method of claim 1, wherein grouping one or more resources that have a same attribute into the resource pool comprises:
grouping memory partitions having a same size into the resource pool, wherein the memory partitions are distributed across a plurality of NUMA sockets.

6. The method of claim 1, wherein grouping the one or more resources having the same attribute into the resource pool is based on configurations described in a configuration file.

7. The method of claim 1, wherein choosing a resource from the resource pool comprises:
choosing a resource from the resource pool that is associated with a same NUMA socket as the NUMA socket associated with the CPU assigned to execute the application instance.

8. A computing device having a non-uniform memory access (NUMA) architecture, the computing device to attach a resource of the computing device to an application instance that is unaware of a NUMA topology of the computing device, the computing device comprising:
a storage device to store a publisher component, a resource manager component, and a resource allocator component; and
one or more processors distributed across one or more NUMA sockets coupled to the storage device, a subset of the one or more processors to execute the publisher component, the resource manager component, and the resource allocator component,
the publisher component configured to detect the NUMA topology of the computing device and to publish the NUMA topology of the computing device, wherein the computing device executes a plurality of virtual machines (VMs) on a hypervisor to implement network function virtualization (NFV), wherein the application instance is executed by a first VM from the plurality of VMs, wherein the published NUMA topology indicates for one or more resources of the computing device, a NUMA socket associated with each of the one or more resources of the computing device, wherein the published NUMA topology is accessible to an Operating System (OS) running on the first VM from the plurality of VMs,
the resource manager component configured to group one or more resources that have a same attribute into a resource pool, wherein the resource pool is assigned a name by which the application instance can refer to the resource pool,
the resource allocator component configured to receive a request from the application instance for a resource from the resource pool, where the request includes the name of the resource pool, to determine a processor assigned to execute the application instance, where the processor is associated with a NUMA socket, the resource allocator component further configured to choose a resource from the resource pool that is associated with a NUMA socket that is closest to the NUMA socket associated with the processor assigned to execute the application instance, and to attach the chosen resource to the application instance.

9. A non-transitory computer readable storage medium, having stored therein instructions to be executed by a computing device having a non-uniform memory access (NUMA) architecture to attach a resource of the computing device to an application instance that is unaware of a NUMA topology of the computing device, the instructions when executed by the computing device cause the computing device to perform a set of operations comprising:
detecting the NUMA topology of the computing device, wherein the computing device executes a plurality of virtual machines (VMs) on a hypervisor to implement network function virtualization (NFV), wherein the application instance is executed by a first VM from the plurality of VMs,
publishing the NUMA topology of the computing device, wherein the published NUMA topology indicates for one or more resources of the computing device, a NUMA socket associated with each of the one or more resources of the computing device wherein the published NUMA topology is accessible to an Operating System (OS) running on the first VM from the plurality of VMs;
grouping one or more resources that have a same attribute into a resource pool, wherein the resource pool is assigned a name by which the application instance can refer to the resource pool;
receiving a request from the application instance for a resource from the resource pool, wherein the request includes the name of the resource pool;
determining a central processing unit (CPU) assigned to execute the application instance, wherein the CPU is associated with a NUMA socket;
choosing a resource from the resource pool that is associated with a NUMA socket that is closest to the NUMA socket associated with the CPU assigned to execute the application instance; and
attaching the chosen resource to the application instance.

10. The non-transitory computer readable storage medium of claim 9, wherein detecting the NUMA topology of the computing device comprises:
measuring and comparing a speed or latency of accessing a plurality of known memory areas of the computing device.

11. The non-transitory computer readable storage medium of claim 9, wherein detecting the NUMA topology of the computing device comprises:
communicating NUMA topology information from the hypervisor to the first VM from the plurality of VMs via a dedicated communication channel between the hypervisor and the first VM.

12. The non-transitory computer readable storage medium of claim 9, wherein the one or more resources of the computing device includes any one of the following: memory pages, device queues, input/output (I/O) devices, and packet buffer pools.

13. The non-transitory computer readable storage medium of claim 9, wherein grouping one or more resources that have a same attribute into the resource pool comprises:
   grouping memory partitions having a same size into the resource pool, wherein the memory partitions are distributed across a plurality of NUMA sockets.

14. The non-transitory computer readable storage medium of claim 9, wherein grouping the one or more resources having the same attribute into the resource pool is based on configurations described in a configuration file.

15. The non-transitory computer readable storage medium of claim 9, wherein choosing a resource from the resource pool comprises:
   choosing a resource from the resource pool that is associated with a same NUMA socket as the NUMA socket associated with the CPU assigned to execute the application instance.

* * * * *